Figure 1:
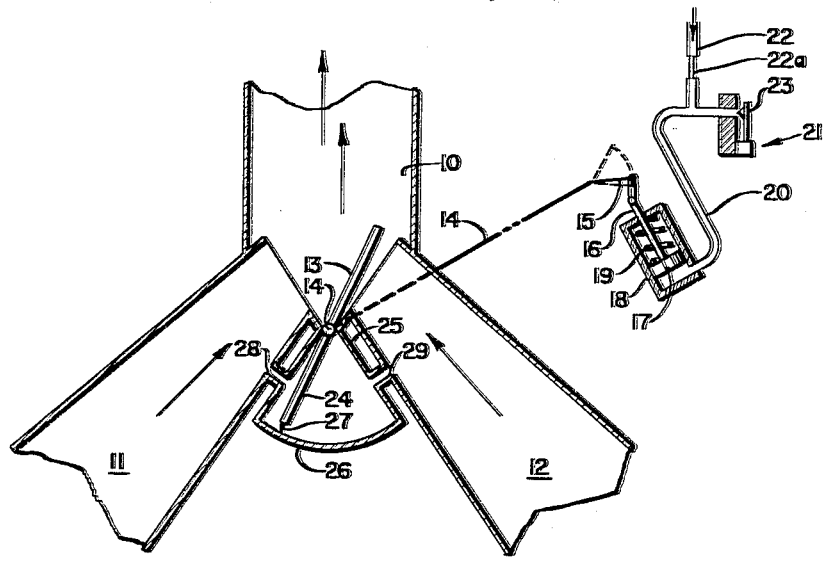

Sept. 12, 1961 R. W. WATERFILL 2,999,640
AIR CONDITIONING MIXING VALVE
Filed June 12, 1957

INVENTOR.
ROBERT W. WATERFILL
BY
Pollard Johnston Smythe & Robertson
ATTORNEYS.

United States Patent Office 2,999,640
Patented Sept. 12, 1961

2,999,640
AIR CONDITIONING MIXING VALVE
Robert W. Waterfill, Montclair, N.J., assignor, by mesne assignments, to Buensod-Stacey Corporation, a corporation of Ohio
Filed June 12, 1957, Ser. No. 665,163
10 Claims. (Cl. 236—13)

The present invention relates to air conditioning systems, and particularly to a new and improved air mixing valve arrangement for such systems.

Prior-known air conditioning systems employ a mixing chamber into which are directed quantities of warm and cool air from separate ducts, and from which chamber mixed air is directed into the zone or room being treated. Usually, a valve is pivotally mounted at the junction of the warm and cool air ducts within the mixing chamber, and it is arranged to move between positions in which the warm air duct is completely closed and the cool air duct is completely open, through intermediate positions where both warm and cool air ducts are partially opened and closed, to a position where the cool air duct is completely closed and the warm air duct completely opened. While this valve may be operated manually, it is usually pivotally or linearly operated by a power source that may be condition responsive, for example, thermostatically controlled by condition variations in the zone or room being treated. Although the power requirements to operate such a valve may not be too serious in low pressure systems with which the principles of the present invention are equally applicable, they do present a problem in so-called high pressure systems, particularly in the region of operation of completely closing either the warm or cool air ducts where the maximum resistance to closing is felt.

Although the principles of the present invention are equally applicable to low pressure systems, they are particularly suitable in high pressure systems where relatively smaller sized branch ducts to individual temperature controlled zones may be used to supply conditioned air to individual mixing valves in said zones. For example, branch ducts having maximum diameters of about two inches to sixteen inches, or the equivalent, can be used in high pressure systems with static pressures usually exceeding approximately two inches of water and with the potential velocity of air in the supply ducts between about 1,500 and 3,500 feet per minute, although these values may vary slightly from those given in what is known as a high pressure system.

One of the principal objects of this invention is to provide a mixing valve arrangement for an air conditioning system, said valve arrangement having a plurality of supply ducts from said conditioning system connected thereto, which valve arrangement will be balanced at least in part by the resultant pressure fluid within the plurality of supply ducts.

Another object includes the provision of such a system in which a mixing valve requires less power to operate it than prior-known mixing valves.

Still another object of the invention is to provide such a system in which a pressure balanced mixing valve is operated in response to condition variations within a room or zone being treated.

Still another object of the invention is to provide such a system is which a mixing valve is operated solely by the resultant fluid pressures within the separate fluid ducts.

In one aspect of the invention, a mixing chamber is provided into which extends warm and cool air ducts with a damper or valve pivotally mounted between the ducts in a manner to effect complete or substantially complete closing of each duct at opposite ends of the valve's pivotal movement. Within the plane of the valve or damper and extending oppositely from its pivot point, an extension may be provided that is adapted to oscillate within a housing or chamber which may be located between the warm and cool air ducts. The space within the housing on each side of the valve extension may be in communication with the air within the ducts.

In one embodiment of the invention, this communication is maintained separate between each duct and its corresponding space within the housing. Accordingly, any pressure differential between the fluid in the separate ducts may be employed to assist an external power source that operates the valve or damper in accordance with condition variations within the zone or room being treated.

In another aspect of the invention, a self contained mixing valve is possible by establishing communication between the fluid within the ducts and either space within the housing while exhausting the other space to atmosphere. By directing a portion of the air from the ducts selectively to one of the spaces within the housing in accordance with condition variations within the zone or room being treated, no external power source is required to operate the valve or damper.

The above, as well as other objects, advantages and features of the invention will become apparent from the following specification and accompanying drawing, which is merely exemplary.

Figure 2:
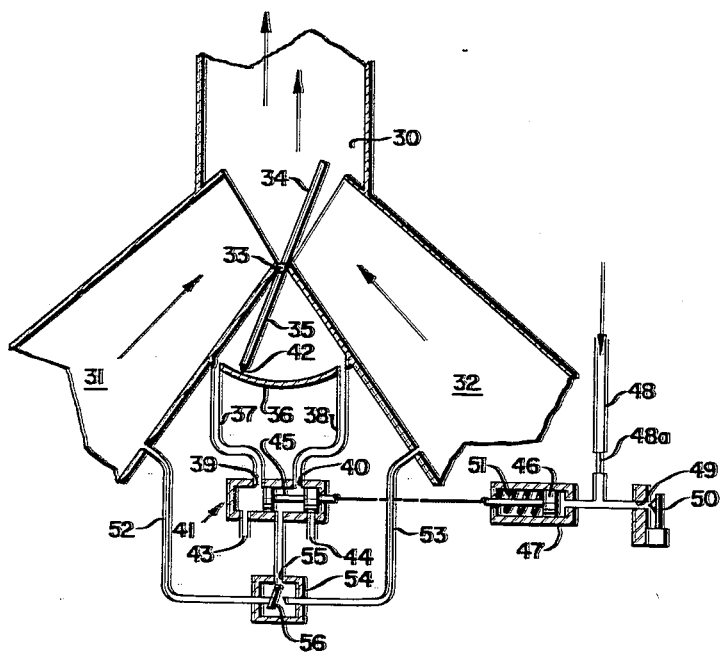

In the drawing:

FIGURE 1 is a sectional view of the mixing chamber and mixing valve arrangement to which the principles of the invention have been applied; and FIG. 2 is a modified form of the invention shown in FIG. 1.

Referring to FIG. 1, the principles of the invention are shown as applied to a structure including a mixing chamber 10 of any convenient design from which mixed air can be directed to a zone or room to be conditioned. Warm and cool air ducts 11 and 12 have their outlets projecting into the mixing chamber 10, or connected therewith. Preferably, they can be arranged to form substantially equal angles with the longitudinal axis of the chamber 10 and to provide a space between the ducts 11 and 12 for a purpose to be described later.

A damper or valve 13 is fixed to a shaft 14 that extends transversely through the chamber 10 at the point of intersection of adjacent walls of the ducts 11 and 12 and which shaft may be oscillatably mounted in bearings supported within said chamber 10. The damper 13 may be of sufficient area to completely cover and close the outlets of the ducts 11 and 12 when the shaft 14 is oscillated between its limits of motion.

The shaft 14 extends outwardly from chamber 10, and as schematically illustrated may be provided with a crank arm 15 that may be connected to a piston rod 16 through a joint that will accommodate angularity, thereby to permit the straight line motion of the piston rod 16 to oscillate the crank arm 15 between two extreme positions. The rod 16 may be connected to a piston 17 within a cylinder 18, in which a compression spring 19 urges the piston rod 16 inwardly of the cylinder 18 and consequently moves the crank 15 in a manner to effect closing of the duct 12 by the damper 13. The end of the cylinder 18 on the side of the piston 17 opposite that acted upon by the spring 19 is connected by a line 20 to a condition responsive device 21 that may be located within the zone or room to be conditioned. Other types of suitable air or electric motors can be used as well as other kinds of pneumatic controls.

The device 21 may include a line 22, having a restriction 22a therein and leading from a source of fluid, such as air, under substantially constant pressure, for example, in the neighborhood of five pounds per square inch, that may exhaust into the atmosphere past a thermostatically controlled valve 23. However, when valve 23 closes due to a condition change within the zone or room being conditioned, closing off the leak or bleed outlet, air from line 22 will build up pressure in line 20, forcing piston 17 against the action of spring 19 oscillating shaft 14 in a direction to cause damper 13 to move toward a position closing the outlet of duct 11 and opening duct 12.

As previously stated, the systems to which the principles of this invention are particularly suitable are so-called high pressure systems so that the force acting on the damper 13 resisting its complete closing is substantial and would, except for the present invention, require a much more positive and forceful external power source than the above described air motor. The present invention contemplates employing part of the energy of the high pressure air supply to assist in the operation of the damper 13. In the embodiment shown in FIG. 1, this has been accomplished by providing a blade 24 fixed to shaft 14, and lying in the plane including damper 13 but extending from said shaft 14 in a direction opposite to the direction damper 13 extends therefrom. The blade 24 is surrounded by a housing 25 located between the ducts 11 and 12 and including an arcuate wall 26 defining the path of motion of the outward end of blade 24. A wiper 27 may be attached to the outer end of blade 24 to form a seal between said outer edge and the arcuate wall 26 of housing 25, thereby forming separate compartments within the housing 25 on each side of blade 24.

The housing 25 is provided with restricted air passages 28 and 29 that lead from ducts 11 and 12 to the interior of housing 25 on opposite sides of the blade 24. The area of blade 24 may be equal to that of damper 13 so that a balancing effect of the damper 13 can be accomplished.

With the apparatus in the condition shown in FIG. 1, the thermostatically controlled valve 23 is throttling the air from line 22 so that spring 19 does not effect the complete closing of the duct 12 by the damper 13. Normally, spring 19 is strong enough to move damper 13 into position to close duct 12 completely, in spite of the increased pressure developed in duct 12 as damper 13 moves into closed position. This is possible because the increasing pressure in duct 12 exists in the housing 25 and acts on blade 24 to offset the force on damper 13 from the pressure fluid in duct 12. The only force, therefore, required to be overcome by the spring 19 is that within housing 25 from duct 11, which will be substantially lower than that within closed duct 12. As the zone or room heats up due to the restriction in the flow of cool air into the mixing chamber 10, the thermostatically operated valve closes so that pressure fluid from line 22 forces piston 17 in a direction to close duct 11 and open duct 12. In the same way that blade 24 assisted the closing of duct 12, it likewise assists the closing of duct 11 so that the pressure applied to piston 17 need be only that required to overcome the lesser pressure in housing 25 from duct 12.

From the foregoing it is evident that a partially balanced mixing valve is provided that requires a minimum of external power to move it from its one limiting position where it completely closes duct 12 to its other limiting position where it completely closes duct 11. In operation, it is to be understood that damper 13 may operate between positions partially closing duct 12 or 11 and still take advantage of the balancing condition due to the blade 24 being subjected to the pressures within housing 25 from ducts 12 and 11.

Referring to FIG. 2, the principles of the invention are shown as applied to a modified form of structure in which external power is not required to operate the chamber. In this form, a mixing chamber 30 similar to chamber 10 is supplied with warm and cool air from separate ducts 31 and 32 that have their outlets connected to chamber 30 in the same way that the outlets of ducts 11 and 12 extend to chamber 10. A shaft 33 similar to shaft 14 is journaled in bearings mounted within chamber 30, but unlike shaft 14 it need not extend outwardly beyond the confines of chamber 30. A damper 34 is fixed to shaft 33 and a blade 35, similar to blade 24, extends into a housing 36 forming separate compartments therein on each side of the blade 35. The area of blade 35, however, preferably is greater than the area of damper 34 for a purpose to be described later. Lines 37 and 38 lead from housing 36 to ports 39 and 40 of a four-way valve 41. The blade 35 is provided with a wiper 42 that cooperates with the arcuate wall of housing 36. The outlets of ducts 31 and 32 may extend into chamber 30 to a point such that when damper 34 completely closes either duct, blade 35 will not interfere with the passage of pressure fluid from lines 37 and 38 to the housing 36 on the left and right hand sides, respectively, of the blade 35.

The valve 41 includes exhaust ports 43 and 44, and a spool 45 that may be connected to a piston 46 that is adapted to be reciprocated in a cylinder 47 of an air motor or the like. A source of constant pressure fluid is adapted to be supplied to a line 48 that leads to cylinder 47 through a restriction 48a and to an exhaust or bleed port 49. A condition responsive device, such as a thermostatically controlled valve 50, similar to valve 23, may control the pressure of air acting on piston 46 to move it in one direction, and a spring 51 within cylinder 47 provides the opposite movement of said piston.

The present embodiment contemplates using the pressure fluid in ducts 31 and 32 for operating the damper 34. In order to employ the pressure fluid in ducts 31 and 32 to operate damper 34 and still prevent one duct from exhausting into the other, lines 52 and 53 extend from ducts 31 and 32, respectively, to a dividing or differential valve 54. The valve 54 includes an outlet 55 leading to valve 41 between the spaced discs of spool 45 thereof. Valve 54 also includes a pressure responsive sensitive curtain or valve member 56 that is located between the aligned inlets to valve 54 from lines 52 and 53. The construction and arrangement of the parts are such that the duct 31 or 32 having the highest pressure forces the curtain 56 into sealing relation with the inlet of the line leading to the low pressure duct so that the high pressure fluid will be directed to valve 41 and not by-passed into the low pressure duct.

With the apparatus in the condition shown in FIG. 2, duct 32 is completely closed by damper 34 since valve 50 exhausts the pressure fluid from line 48 to the atmosphere. Accordingly, spring 51 maintains the spool 45 in a position such that the fluid from either or both of ducts 31 and 32 having the highest initial or equal pressures forces blade 35 in a clockwise direction, tending to move damper 34 in a direction to close duct 32. Curtain 56 seals off the outlet from line 52, and the pressure differential causes fluid from line 53 to act on blade 35. This resultant differential pressure is less than the pressure in duct 32; however, since the area of blade 35 exceeds that of damper 34, and the housing 36 on the lefthand side of damper 34 is open to exhaust, complete closing of duct 32 by damper 34 can be effected.

As the room or zone being treated heats up, the valve 50 closes the bleed port 49, thereby causing the pressure fluid from line 48 to move the piston 46 and the spool 45 leftwardly (FIG. 2) thereby to direct the pressure fluid to line 37 and open line 38 to exhaust. Initially, the high pressure fluid comes from duct 32 until such time as the movement of damper 34 in closing duct 31 increases the pressure fluid therein over that obtaining in duct 32. At this time the higher pressure fluid in duct 31 takes over the operation of the damper 34 in effecting its complete closing of duct 31 through valves 54 and 41 in the same manner as previously explained.

It is, of course, to be understood that the action of spool 45 also may throttle the passage of pressure fluid to housing 36 as well as the exhaust therefrom. Therefore, damper 34 may only partially close either duct 31 or 32 an amount depending upon the specific design and operating conditions of a particular installation, which design and conditions of operation may be varied within wide limits to attain optimum results.

Although the various features of the new and improved mixing valve arrangement have been shown and described in detail to fully disclose two embodiments of the invention, it will be evident that numerous changes may be made in such details, and certain features may be used without others without departing from the principles of the invention.

What is claimed is:

1. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said mixing chamber is closed and the other is open; means connected between said ducts forming an hermetically sealed housing; a blade lying substantially in the plane of said damper and extending from its pivotal mounting into said housing, the outer end of said blade cooperating with a wall of said housing to form separate compartments therein; and restricted conduit means connected to said housing for causing the differential pressure between said ducts to act on said blade and at least partially balance the thrust on said damper caused by the air pressure within the duct being closed.

2. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said chamber is closed and the other is open; means connected between said ducts forming an hermetically sealed housing; a blade lying substantially in the plane of said damper and extending from its pivotal mounting into said housing, the other end of said blade cooperating with a wall of said housing to form separate compartments therein; restricted conduit means for causing the differential pressure between said ducts to act on said blade and at least partially balance the thrust on said damper caused by the air pressure within the duct being closed; and condition responsive means operably connected with said damper for determining the duct to be closed by said damper.

3. In an air conditioning system having a mixing chamber into which separate warm and cool air ducts are directed for feeding air thereto, a mixing valve including a damper adapted to be moved between positions to close the outlet of either of said ducts into said chamber; an external source of power connected to said damper for moving said damper between said positions; condition responsive means connected to said external source of power for controlling the operation of said external source of power; and differential pressure responsive means having restricted conduit means communicating with said separate ducts and acting on said damper in a manner to require a minimum of said external power in moving said damper between said positions.

4. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said chamber is closed and the other is open; means between said ducts forming an hermetically sealed housing; a blade lying substantially in the plane of said damper and extending from its pivotal mounting into said housing, the outer end of said blade cooperating with a wall of said housing to form separate compartments therein; a restricted communicating passage between one of said ducts and one of said compartments; and another restricted communicating passage between the other duct and the other compartment.

5. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said chamber is closed and the other open; means between said ducts forming an hermetically sealed chamber; a blade lying substantially in the plane of said damper and extending from its pivotal mounting into said chamber, the outer end of said blade cooperating with a wall of said chamber to form separate compartments therein; an external source of power connected to said damper for moving said damper between said extreme limits of motion; condition responsive means for controlling the operation of said external source of power; a restricted communicating passage between one of said ducts and one of said compartments; and another restricted communicating passage between the other duct and the other compartment.

6. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said chamber is closed and the other is open; means between said ducts forming an hermetically sealed housing; a blade lying substantially in the plane of said damper and extending from its pivotal mounting into said housing, the effective area of said blade being greater than the effective area of said damper and the outer end of said blade cooperating with a wall of said housing to form separate compartments therein; controllable connection means from each side of said housing and condition responsive means for selectively directing air under pressure from a selected duct through said connection means to one of said compartments.

7. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said chamber is closed and the other is open; means between said ducts forming an hermetically sealed housing; a blade lying substantially in the plane of said damper and extending from its pivotal mounting into said housing, the effective area of said blade being greater than the effective area of said damper and the outer end of said blade cooperating with a wall of said housing to form separate compartments therein; controllable communicating means between said ducts and either of said compartments; and condition responsive means connected with said controllable means for selecting the compartment with which said ducts communicate.

8. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said chamber is closed and the other is open; means between said ducts forming an hermetically sealed housing; a blade lying substantially in the plane of said damper and extending from its pivotal mounting into said housing, the effective area of said blade being greater than the effective area of said damper and the outer end of said blade cooperating with a wall of said housing to form separate compartments therein; controllable communicating means between said ducts and either of said compartments; condition responsive means connected with said controllable means for selecting the compartment with which said ducts communicate; and means for preventing the one duct from communicating with the other duct ahead of said mixing chamber.

9. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said chamber is closed and the other is open; means between said ducts forming an hermetically sealed housing; a blade lying substantially in the plane of said damper and extending from its pivotal mounting into said housing, the outer end of said blade cooperating with a wall of said housing to form separate compartments therein; a four-way valve connected to said compartments; means extending from said ducts for supplying air under pressure to said valve; means for preventing the one duct from communicating with the other duct ahead of said mixing chamber; and condition responsive means connected to said valve for operating the valve to selectively establish communication between one of said compartments and said supply from said ducts, and for exhausting the other compartment.

10. In an air conditioning system having a mixing chamber into which separate warm and cool air ducts are directed for feeding air thereto, a mixing valve including a damper pivotally mounted within said chamber and adapted to be moved between two extreme limits of motion where the outlet of one of said ducts into said mixing chamber is closed and the other is open; means connected between said ducts forming an hermetically sealed housing; a blade extending oppositely from the pivotal mounting of said damper into said housing, the outer end of said blade cooperating with a wall of said housing to form separate compartments therein; and restricted conduit means connected to said housing for causing the differential pressure between said ducts to act on said blade and at least partially balance the thrust on said damper caused by the air pressure within the duct being closed.

References Cited in the file of this patent

UNITED STATES PATENTS

| | | |
|---|---|---|
| 986,165 | Graham | Mar. 7, 1911 |
| 989,543 | Geissinger | Apr. 11, 1911 |
| 1,000,435 | Pagelsen | Aug. 15, 1911 |
| 1,076,293 | Lawler | Oct. 21, 1913 |
| 1,087,908 | Reinecke | Feb. 17, 1914 |
| 1,819,045 | Snediker | Aug. 18, 1931 |
| 1,901,268 | Snediker | Mar. 14, 1933 |
| 1,996,330 | Goshaw | Apr. 2, 1935 |
| 2,624,541 | Ziebolz | Jan. 6, 1953 |

FOREIGN PATENTS

| | | |
|---|---|---|
| 728,667 | France | Apr. 18, 1932 |
| 253,317 | Great Britain | June 17, 1926 |

UNITED STATES PATENT OFFICE
CERTIFICATE OF CORRECTION

Patent No. 2,999,640                  September 12, 1961

Robert W. Waterfill

It is hereby certified that error appears in the above numbered patent requiring correction and that the said Letters Patent should read as corrected below.

Column 4, line 1, for "chamber", first occurrence, read -- damper --; column 5, line 46, for "other" read -- outer --.

Signed and sealed this 14th day of April 1964.

(SEAL)
Attest:
ERNEST W. SWIDER

Attesting Officer

EDWARD J. BRENNER

Commissioner of Patents